United States Patent
Tsai et al.

(10) Patent No.: US 11,320,182 B2
(45) Date of Patent: May 3, 2022

(54) INTEGRATED WATER-COOLED AIR CONDITIONING DEVICE

(71) Applicant: NATIONAL TAIPEI UNIVERSITY OF TECHNOLOGY, Taipei (TW)

(72) Inventors: Yu-Hsi Tsai, Taipei (TW); Jian-Wen Chen, New Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 385 days.

(21) Appl. No.: 16/512,629

(22) Filed: Jul. 16, 2019

(65) Prior Publication Data

US 2020/0158389 A1 May 21, 2020

(30) Foreign Application Priority Data

Nov. 15, 2018 (TW) .................................. 107140659

(51) Int. Cl.
*F25B 1/00* (2006.01)
*F25B 39/04* (2006.01)

(52) U.S. Cl.
CPC ................ *F25B 39/04* (2013.01); *F25B 1/00* (2013.01); *F25B 2339/046* (2013.01); *F25B 2339/047* (2013.01)

(58) Field of Classification Search
CPC ....... F24F 1/039; F24F 1/02; F25B 2339/046; F25B 2339/047; F25B 2339/041; F25B 39/04
See application file for complete search history.

(56) References Cited

U.S. PATENT DOCUMENTS 4,382,369 A * 5/1983 Stocking .................. F24F 1/02
 62/280
4,404,814 A * 9/1983 Beasley .................... F24F 1/02
 62/171

(Continued)

FOREIGN PATENT DOCUMENTS

CN 205481662 U 8/2016
CN 207247391 U 4/2018

OTHER PUBLICATIONS

Office Action dated Dec. 14, 2010 of the corresponding Taiwan patent application No. 107140659.

*Primary Examiner* — Cassey D Bauer
(74) *Attorney, Agent, or Firm* — Chun-Ming Shih; HDLS IPR Services

(57) ABSTRACT

The present invention provides an integrated water-cooled air conditioning device, which comprises a cooling water tank device and an air conditioning system. The cooling water tank device includes a cooling water tank. A water tank region is disposed at the bottom of the cooling water tank for accommodating water. The air conditioning system includes a compressor, a condenser, a regulator, and an evaporator connected sequentially by a refrigerant piping. The condenser is formed by spirally bending the refrigerant piping to a spiral hollow tube in the water tank region. Thereby, the air conditioning system and the cooling-water circulation system can be connected integrally for miniaturization. The shortcomings of long heat dissipation loop, high pressure loss, and large size can be solved. Accordingly, the installation costs can be lowered, and the subsequent maintenance management can be convenient.

2 Claims, 2 Drawing Sheets

(56) References Cited

U.S. PATENT DOCUMENTS

| | | | |
|---|---|---|---|
| 8,144,467 B2* | 3/2012 | Campbell | H05K 7/20736 361/699 |
| 2012/0047936 A1* | 3/2012 | Junge | F25B 6/04 62/291 |
| 2015/0253046 A1* | 9/2015 | Parker | F24F 5/0035 62/304 |
| 2016/0061508 A1* | 3/2016 | Lowrimore | F24H 9/20 62/160 |
| 2016/0091215 A1* | 3/2016 | Wong | F25B 13/00 62/160 |
| 2017/0153048 A1* | 6/2017 | Visser | F28C 1/16 |
| 2017/0198950 A1* | 7/2017 | Bresson | F25B 41/20 |
| 2017/0276382 A1* | 9/2017 | Alazazmeh | F25B 19/00 |
| 2018/0163979 A1* | 6/2018 | Seo | F25B 39/04 |
| 2018/0299142 A1* | 10/2018 | Myeong | F24F 13/20 |
| 2018/0320934 A1* | 11/2018 | Clark | F25B 25/005 |

* cited by examiner

INTEGRATED WATER-COOLED AIR CONDITIONING DEVICE

FIELD OF THE INVENTION

The present invention relates generally to an air conditioning device, and particularly to an integrated water-cooled air conditioning device having superior thermal exchange efficiency and economic benefit.

BACKGROUND OF THE INVENTION

As the technologies progress and the problem of global warming becomes severe day by day, people use air conditioning apparatuses in hot summers for cooling the indoor temperature and achieving the goal of comfortable lives. The commercial air conditioning apparatuses can be categorized into air-cooled and water-cooled air conditioners. Air-cooled air conditioners use compressor-processed refrigerant to perform thermal exchange with the air directly via metal piping. On the other hand, water-cooled air conditioners use refrigerant to absorb indoor heat and the thermal energy is carried by water to outdoor cooling water tank for dissipating heat. Each of the two methods has pros and cons. Most large-scale malls or public buildings, such as stations and activity centers, adopt water-cooled air conditioners.

FIG. 1 shows a structural schematic diagram of the water-cooled air conditioner according to the prior art. The water-cooled air conditioner 80 includes a compressor 81, a condenser 82, a refrigerant controller 83, an evaporator 84 (air conditioning system), a cooling water tank 91, and a cooling water pump 94 (cooling-water circulation system). The compressor 81, the condenser 82, the refrigerant controller 83, and the evaporator 84 are connected using a refrigerant piping 811 including refrigerant. The compressor 81 withdraws low-temperature low-pressure gas refrigerant from the evaporator 84, compresses it to high-temperature high-pressure gas refrigerant, and transports it to the condenser 82. The condenser 82 releases the heat from the high-temperature high-pressure gas refrigerant, transforming it to low-temperature high-pressure gas refrigerant and transport it to the refrigerant controller 83. Thereby, the condenser 82 is in the heat-dissipating high-temperature status, requiring the cooling system formed by the cooling water tank 92 for circulation and heat dissipation. Afterwards, the refrigerant controller 83 regulates and reduced the pressure of the low-temperature high-pressure gas refrigerant, transforming it to low-temperature low-pressure liquid refrigerant before entering the evaporator 84. Next, the evaporator 84 evaporates and releases heat to the low-temperature low-pressure liquid refrigerant, making the surface temperature of the evaporator 84 extremely low. By using a blower 85, the refrigeration capacity (the cooled air) is transported indoors for lowing the room temperature.

The cooling water tank 92 includes water for performing cooling circulation. The cooling water tank 91 includes a water outlet 911 and a water inlet 912. The water outlet 911 is connected to a cold-water piping 92 for supplying water. The cold-water piping 92 transports cold water to the condenser 82 via the cooling-water pump 94 for performing complete thermal exchange with the refrigerant piping 811. The cold water in the cold-water piping 92 absorb heat in the condenser 82 and becomes hot water, which is transported by a recycle piping 93 to the water inlet 912 and entering the cooling water tank 91. After heat dissipation, the hot water becomes cold water for further circulation and cooling.

Although the above water-cooled air conditioning technology can achieve the purpose of cooling, it still have some drawbacks. For example, because the air conditioning system and the cooling-water circulation system cannot be connected integrally, the overall size cannot be miniaturized, leading to long heat-dissipating circuit, high pressure loss, and large size. The assembling costs will be increased and the future maintenance will be unfavorable, proving it not an ideal design. In addition, the thermal exchange of the cooling water tank and the condenser cannot be integrated, making it unbeneficial to improving the thermal exchange efficiency.

Accordingly, the present invention provides an integrated water-cooled air conditioning device having the advantages of integration, miniaturization, assembly convenience, and economic benefit for solving the drawbacks of the water-cooled air conditioning technology according to the prior art.

SUMMARY

An objective of the present invention is to provide an integrated water-cooled air conditioning device, in which the air conditioning system and the cooling-water circulation system can be connected integrally, making the overall size miniaturized and solving the drawbacks of long heat-dissipating circuit, high pressure loss, and large size. Thereby, the assembling costs will be reduced, the future maintenance will be convenient, and the economic benefit will be enhanced.

Another objective of the present invention is to provide an integrated water-cooled air conditioning device, which can integrate the thermal exchange of the cooling water tank and the condenser and hence improving the thermal exchange efficiency significantly.

A further objective of the present invention is to provide an integrated water-cooled air conditioning device, which can recycle the condensed water formed by the evaporator and the vapor carried by the heat-dissipating airflow effectively and replenish the cooling-water circulation system effectively, enabling superior water saving.

To achieve the above objectives, the present invention comprises a cooling water tank device and an air conditioning system. The cooling water tank device includes a cooling water tank. A water tank region is disposed at the bottom of the cooling water tank for accommodating water. The air conditioning system includes a compressor, a condenser, a regulator, and an evaporator connected sequentially by a refrigerant piping. The condenser is formed by spirally bending the refrigerant piping to a spiral hollow tube in the water tank region.

According to an embodiment of the present invention, a blower is disposed on one side of the evaporator. A water-collecting tank is disposed at the bottom of the evaporator. The water-collecting tank is connected with a recycle water piping. The recycle water piping is connected to the cooling water tank.

According to an embodiment of the present invention, the compressor, the regulator, the evaporator, and the blower are integrated in a case adjacent to one side of the cooling water tank.

According to an embodiment of the present invention, a circulation fan and an air outlet are disposed at the top of the cooling water tank; an air inlet is disposed at the bottom of the cooling water tank. In addition, a water-drawing device is disposed in the water tank region and connected to a water-drawing piping, which is connected to a spray device.

The spray device is disposed in the cooling water tank and below the circulation fan and includes one or more spray head. A stuffing device is disposed below the spray device and located above the air inlet.

According to an embodiment of the present invention, the cooling water tank includes a vent opposing to the location of the blower outside the cooling water tank. Thereby, a portion of the external cold air entering the cooling water tank via the air inlet can be drawn by the blower via the vent after entering the stuffing device for cooling the evaporator.

Alternatively, the present invention provide an integrated water-cooled air conditioning device, which comprises a cooling water tank device and an air conditioning system. The cooling water tank device includes a cooling water tank. A water tank region is disposed at the bottom of the cooling water tank for accommodating water. The air conditioning system includes a compressor, a condenser, a regulator, and an evaporator connected sequentially by a refrigerant piping. A blower is disposed on one side of the evaporator. A water-collecting tank is disposed at the bottom of the evaporator. The water-collecting tank is connected with a recycle water piping. The recycle water piping is connected to the cooling water tank.

According to an embodiment of the present invention, the condenser is formed by spirally bending the refrigerant piping to a spiral hollow tube in the water tank region.

According to an embodiment of the present invention, the compressor, the regulator, the evaporator, and the blower are integrated in a case adjacent to one side of the cooling water tank.

According to an embodiment of the present invention, a circulation fan and an air outlet are disposed at the top of the cooling water tank; an air inlet is disposed at the bottom of the cooling water tank. In addition, a water-drawing device is disposed in the water tank region and connected to a water-drawing piping, which is connected to a spray device. The spray device is disposed in the cooling water tank and below the circulation fan and includes one or more spray head. A stuffing device is disposed below the spray device and located above the air inlet.

According to an embodiment of the present invention, the cooling water tank includes a vent opposing to the location of the blower outside the cooling water tank. Thereby, a portion of the external cold air entering the cooling water tank via the air inlet can be drawn by the blower via the vent after entering the stuffing device for cooling the evaporator.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
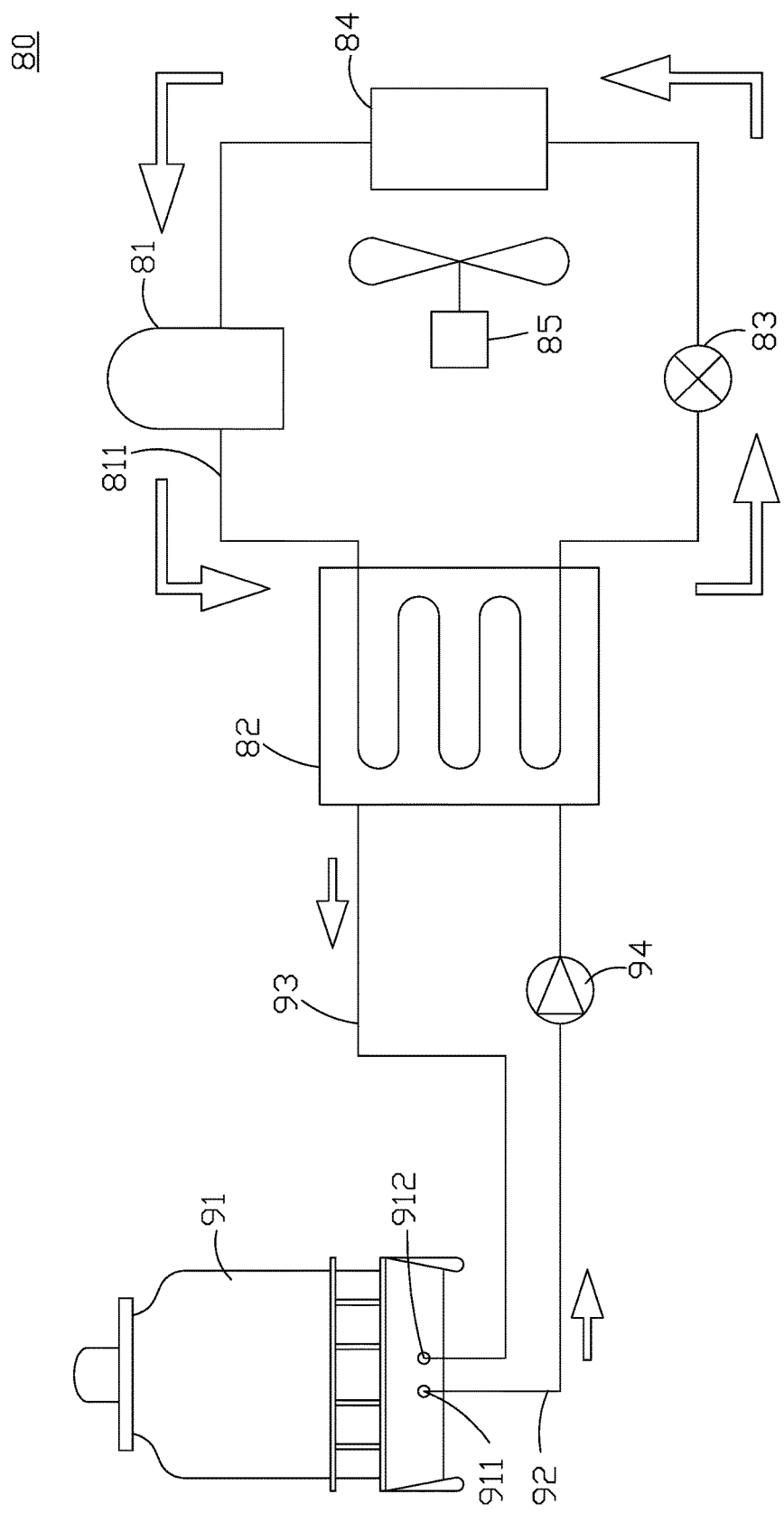
FIG. 1 shows a structural schematic diagram of the water-cooled air conditioner according to the prior art.
Figure 2:
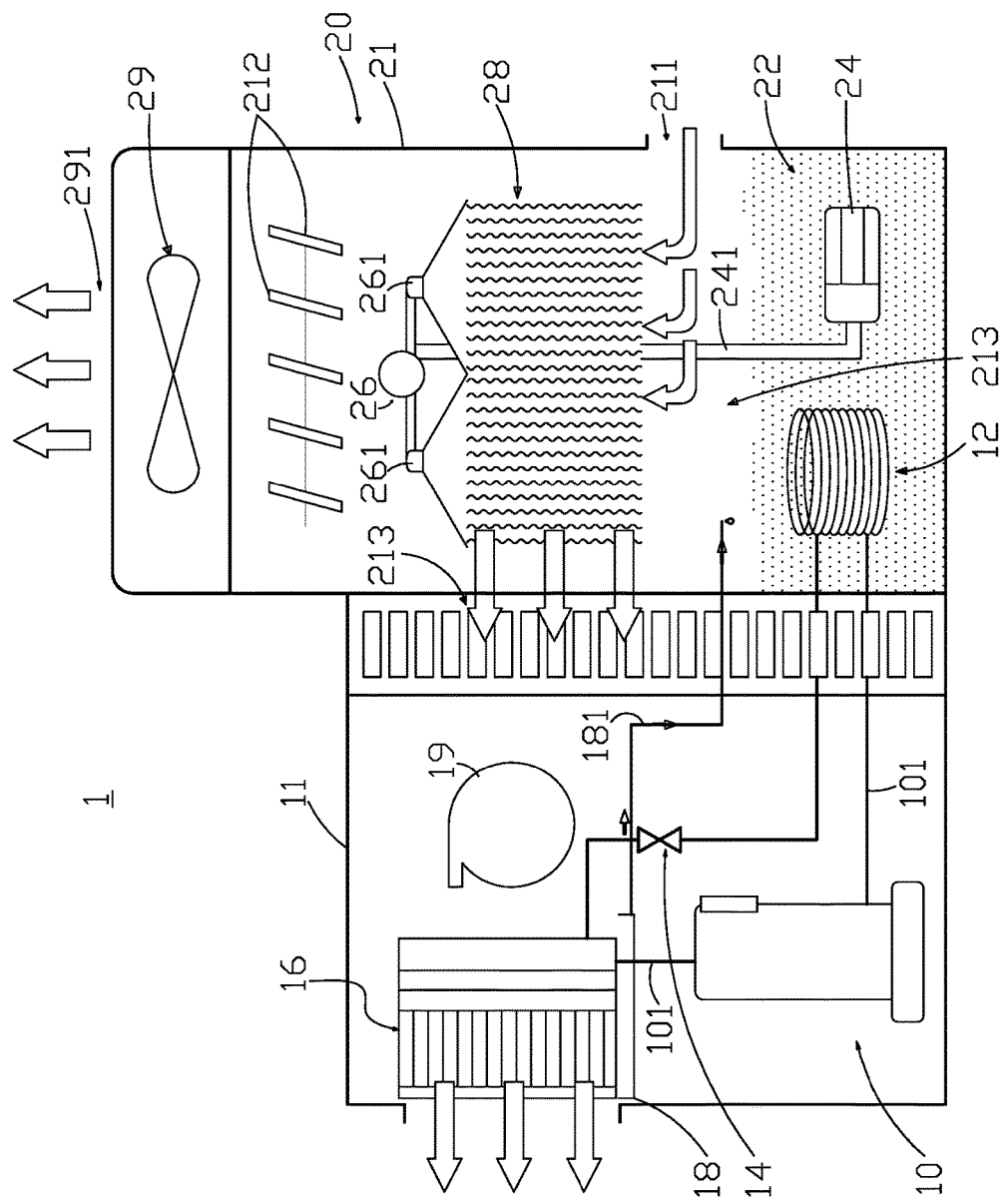
FIG. 2 shows a schematic diagram of the overall structure according to the present invention.

Please refer to FIG. 2. The present invention provides an integrated water-cooled air conditioning device, which is formed by integrating the air conditioning system and the cooling-water circulation system. The water-cooled air conditioning device 1 comprises a compressor 10, a condenser 12, a regulator 14, an evaporator 16 (the above forming air conditioning system), and the cooling water tank device 20 (the cooling-water circulation system). The compressor 10, the condenser 12, the regulator 14, and the evaporator 16 are connected sequentially by a refrigerant piping 101 including refrigerant. The cooling water tank device 20 includes a cooling water tank 21. A water tank region 22 is disposed at the bottom of the cooling water tank 21. The water tank region 22 includes water for performing cooling circulation.

The compressor 10 withdraws the low-temperature low-pressure gas refrigerant from the evaporator 16 via the refrigerant piping 101 and compresses it to high-temperature high-pressure gas refrigerant. The refrigerant piping 101 passing through the compressor 10 enters the water tank region 22 of the cooling water tank 21. The refrigerant piping 101 bends spirally to form a spiral hollo tube and forming the condenser 12. In other words, the condenser 12 is a spiral hollow tube immersed in the water tank region 22 for increasing the area for thermal exchange substantially. At this moment, the condenser 12 is at a high-temperature status and dissipates heat by passing through the water tank region 22. Thereby, the water in the water tank region 22 can be used for dissipation heat. The condenser 12 releases heat in the high-temperature high-pressure gas refrigerant in the refrigerant piping 101 and transforms it to low-temperature high-pressure gas refrigerant. The refrigerant piping 101 passing through the condenser 12 next exits the cooling water tank 21 and is connected to the regulator 14. The regulator 14 (a refrigerant controller) can be an expansion valve or a capillary tube. According to the present embodiment, the regulator 14 is a thermostatic expansion valve used for reducing the pressure of the low-temperature high-pressure gas refrigerant and transforming it to low-temperature low-pressure liquid refrigerant. Next, the refrigerant piping 101 passing through the regulator 14 is connected to the evaporator 16. The evaporator 16 evaporates the low-temperature low-pressure liquid refrigerant, absorbs heat, and transforms it to low-temperature low-pressure gas refrigerant, enabling the surface temperature of the evaporator 16 extremely low. By using the blower 19, the refrigeration capacity (the cooled air) is transported indoors for lowing the room temperature. The blower 19 is disposed on one side of the evaporator 16. Alternatively, the blower 19 is disposed between the evaporator 16 and the cooling water tank 21. Afterwards, the refrigerant piping 101 passing through the evaporator 16 is connected to the compressor 10.

Besides, a water-collecting tank 1 is disposed at the bottom of the evaporator 16. Because the refrigerant absorbs heat in the evaporator 16 and cooling the surface of the evaporator 16, water will be condensed on the surface of the evaporator 16. The condensed water will drop down and be collected in the water-collecting tank 18. The water-collecting tank 18 is connected to a recycle water piping 181, which is connected to the cooling water tank 21. Thereby, the water in the water-collecting tank 18 can flow to the water tank region 22 via the recycle water piping 181 and be used as the water for replenishing the cooling-water circulation system.

Because the compressor 10, the condenser 12, the regulator 14, and the evaporator 16 of the air conditioning system and the cooling water tank device 20 of the cooling-water circulation system are integrated and the condenser 12 is placed in the water tank region 22, the compressor 10, the condenser 12, the regulator 14, the evaporator 16, and the blower 19 can be integrated in a case 11 adjacent to one side of the cooling water tank device 20 (the cooling water tank 21). In other words, the case 11 and the cooling water tank 21 facilitate integration of the air conditioning apparatuses.

As shown in the figure, a circulation fan 29 is disposed at the top of the cooling water tank 21; an air inlet 211 is disposed at the bottom of the cooling water tank 21; an air outlet 291 is disposed above the circulation fan 20 of the cooling water tank 21 for exhausting hot air; and a vent 212 is disposed below the circulation fan 29 of the cooling water tank 21. The air inlet 211 is located slightly above the water tank region 22. The vent 212 and the air inlet 211 can be adjusted according to the operation of the circulation fan 29.

The cooling water tank device 20 further includes a water-drawing device 24 and a spray device 26. The water-drawing device 24 can be an immersion circulation pump placed in the water of the water tank region 22. The water-drawing device 24 is connected to a water-drawing piping 241. According another embodiment, the water-drawing device can be a pumping motor alternatively. The pumping motor is connected to the water tank region 22 via a pumping piping. The spray device 26 is disposed in the cooling water tank 21 and below the circulation fan 29 (the vent 212), and includes a plurality of spray heads 261 connected by piping. The spray device 26 (the spray head 261) is also connected and communicates with the water-drawing piping 241 (or the pumping piping). In addition, a stuffing device 28 (or a stuffing region) is disposed below the spray device 26 in the cooling water tank 21. The stuffing device 28 is used for enabling thermal exchange between water (vapor) and the air. The stuffing device 28 (or the stuffing region) is located above the air inlet 211. Thereby, a spray zone is formed between the plurality of spray heads 261 and the stuffing device 28 (or the stuffing region); a water-dropping region between the stuffing device 28 (or the stuffing region) and the water tank region 22.

When the integrated water-cooled air conditioning device 1 according to the present invention operates, because the refrigerant piping 101 enters the water tank region 22 and the refrigerant piping 10 is spirally bent to a spiral hollow tube for forming the condenser 12 and immersed in the water tank region 22 for performing thermal exchange, the temperature of the cooling water in the water tanks region 22 is increased. The water-drawing device 24 (the immersion circulation pump) draws the cooling water in the water tank region 22 to the spray device 26 for spraying through the plurality of spray heads 261. The sprayed hotter cooling water is cooled by the spray zone, the stuffing region, and the water-dropping region and then falls to the water tank region 22 for the usage of the cooling-water circulation system. Meanwhile, due to the operation of the circulation fan 29, the external cold air can enter the cooling water tank 21 via the air inlet 211. The cold air passes through the water-dropping region, the stuffing device 28 (or the stuffing region), and the spray zone for cooling the water and is exhausted from the cooling water tank 21 via the air outlet 291. Then the operation of the cooling-water circulation system is completed.

According to an appropriate embodiment, a vent 213 can be disposed at the cooling water tank 21 opposing to the stuffing device 28 (or the stuffing region). The vent 213 is also approximately opposing to the blower 19 of the cooling water tank 21. Thereby, a portion of the external cold air entering the cooling water tank 21 via the air inlet 211 can be vented by the blower 19 via the vent 213 after entering the stuffing device 28 (or the stuffing region) for cooling the evaporator 16. Because the water-collecting tank 18 and the recycle water piping 181 connected to the cooling water tank 21 are disposed below the evaporator 16, the vapor exhausted via the vent 213 can be condensed by the evaporator 16 and recycled.

By using the above disposal according to the present invention, the air conditioning system and the cooling-water circulation system can be connected integrally, making the overall size miniaturized and solving the drawbacks of long heat-dissipating circuit, high pressure loss, and large size. Thereby, the assembling costs will be reduced, the future maintenance will be convenient, and the economic benefit will be enhanced. In addition, the present invention can further integrate the thermal exchange of the cooling water tank and the condenser and hence improving the thermal exchange efficiency significantly. Moreover, the present invention can recycle the condensed water formed by the evaporator and the vapor carried by the heat-dissipating airflow effectively and replenish the cooling-water circulation system effectively, enabling superior water saving.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. An integrated water-cooled air conditioning device, comprising:
    a cooling water tank device including a cooling water tank and a baffle, and the cooling water tank having an air inlet and a water tank region at the bottom of the cooling water tank, the baffle being disposed inside the cooling water tank and above the air inlet; and
    an air conditioning system, including a case, and a compressor, a condenser, a regulator, and an evaporator connected sequentially by a refrigerant piping, the case being adjacent to one side of the cooling water tank; the air conditioning system further comprising a blower; the compressor, the regulator, the evaporator, and the blower being disposed inside the case, and the blower being disposed at one side of the evaporator, and said condenser formed by spirally bending said refrigerant piping to a spiral hollow tube in said water tank region,
    wherein the cooling water tank includes a vent opposing to the location of the blower outside the cooling water tank; a portion of the external cold air entering the cooling water tank via the air inlet can be drawn by the blower via the vent after entering said baffle for cooling the evaporator; and
    wherein the air conditioning system further comprises a water-collecting tank disposed below the evaporator, the water-collecting tank is connected to a recycle water piping; and the recycle water piping is connected to the cooling water tank, such that water collected in the water-collecting tank flows back to the water tank region.

2. The integrated water-cooled air conditioning device of claim 1, wherein a circulation fan and an air outlet are disposed at the top of said cooling water tank; a water-drawing device is disposed in said water tank region and connected to a water-drawing piping; said water-drawing piping is connected to a spray device; said spray device is disposed in said cooling water tank and below said circulation fan; said spray device includes one or more spray head, the baffle is disposed below the spray device.

* * * * *